(12) United States Patent
Barel

(10) Patent No.: US 10,185,409 B2
(45) Date of Patent: Jan. 22, 2019

(54) STYLUS WITH AN ADJUSTABLE DIMENSION

(71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 381 days.

(21) Appl. No.: 15/070,091

(22) Filed: Mar. 15, 2016

(65) Prior Publication Data
US 2017/0269718 A1    Sep. 21, 2017

(51) Int. Cl.
| | |
|---|---|
| *G06F 3/03* | (2006.01) |
| *B43K 8/00* | (2006.01) |
| *B43K 23/00* | (2006.01) |
| *G06F 3/0354* | (2013.01) |
| *B43K 23/008* | (2006.01) |
| *B43K 5/00* | (2006.01) |
| *B43K 7/00* | (2006.01) |
| *G06F 3/038* | (2013.01) |

(52) U.S. Cl.
CPC .......... *G06F 3/03545* (2013.01); *B43K 5/005* (2013.01); *B43K 7/005* (2013.01); *B43K 8/003* (2013.01); *B43K 23/00* (2013.01); *B43K 23/008* (2013.01); *G06F 3/0383* (2013.01)

(58) Field of Classification Search
CPC ........ B43K 5/005; B43K 7/005; B43K 8/003; B43K 23/00; B43K 23/008; B43K 23/02; B43K 24/06; B43K 29/20; A45C 11/04; G06F 3/03545
See application file for complete search history.

(56) References Cited

U.S. PATENT DOCUMENTS

| | | | |
|---|---|---|---|
| 3,652,173 A | 3/1972 | Miller et al. | |
| 3,876,315 A * | 4/1975 | Hain | B43K 5/005 |
| | | | 401/209 |

(Continued)

FOREIGN PATENT DOCUMENTS

| | | |
|---|---|---|
| DE | 102004060161 | 6/2006 |
| EP | 1585016 | 10/2005 |

(Continued)

OTHER PUBLICATIONS

Official Action dated Mar. 7, 2017 From the US Patent and Trademark Office Re. U.S. Appl. No. 14/882,506. (23 pages).

(Continued)

*Primary Examiner* — Jennifer C Chiang
*Assistant Examiner* — Bradley Oliver
(74) *Attorney, Agent, or Firm* — Holzer Patel Drennan

(57) ABSTRACT

A stylus includes a cylindrical shaped housing and a shell. The shell is rotatably connected to the housing. A cross-sectional area of the housing has a first dimension along a first axis and a second dimension along a second axis, the first axis perpendicular to the second axis. The first dimension is smaller than the second dimension. A cross-sectional area including both the shell and the housing has a third dimension along the first axis that is substantially the same as the first dimension while the shell is in a first position and substantially the same as the second dimension while the shell is in a second position.

20 Claims, 9 Drawing Sheets

(56) References Cited

U.S. PATENT DOCUMENTS

| | | | |
|---|---|---|---|
| 4,200,403 A * | 4/1980 | Chu | B43K 7/005 401/116 |
| 4,508,464 A * | 4/1985 | Money | B42D 9/007 40/334 |
| 4,568,213 A * | 2/1986 | Money | B42D 9/007 401/202 |
| 4,738,558 A * | 4/1988 | Hiromori | B43K 23/122 273/155 |
| 5,760,347 A | 6/1998 | Notarianni et al. | |
| 5,850,059 A | 12/1998 | Yoshimura | |
| 5,988,918 A * | 11/1999 | Johnson | B43K 5/005 401/88 |
| 6,039,492 A * | 3/2000 | Chen | B43K 7/005 401/194 |
| 6,075,189 A | 6/2000 | Robb | |
| 6,135,661 A * | 10/2000 | Houser | B43K 29/12 401/195 |
| 6,146,038 A | 11/2000 | Mittersinker et al. | |
| 6,512,513 B2 | 1/2003 | Fleck et al. | |
| 6,707,451 B1 | 3/2004 | Nagaoka | |
| 6,752,557 B1 | 6/2004 | Hsieh | |
| 6,819,557 B2 * | 11/2004 | Lilenfeld | G06F 3/03545 345/179 |
| 6,854,681 B2 | 2/2005 | Kish | |
| 7,046,236 B2 | 5/2006 | Blacklock | |
| 7,077,594 B1 | 7/2006 | Annerino et al. | |
| 7,528,825 B2 | 5/2009 | Sakurai et al. | |
| 8,226,315 B1 | 7/2012 | McKinley et al. | |
| 8,780,040 B2 | 7/2014 | Chuang et al. | |
| 9,067,458 B1 * | 6/2015 | Mock | B43K 23/008 |
| 9,120,347 B1 * | 9/2015 | Mock | B43K 21/006 |
| 9,186,929 B1 * | 11/2015 | Mock | B43M 3/045 |
| 9,452,634 B1 * | 9/2016 | Mock | B43K 7/005 |
| 2002/0133906 A1 * | 9/2002 | Fedon | A45C 13/007 16/225 |
| 2002/0197095 A1 * | 12/2002 | Chao | B43K 29/20 401/195 |
| 2003/0235455 A1 * | 12/2003 | Chao | A45C 11/04 401/131 |
| 2004/0233177 A1 | 11/2004 | Blacklock | |
| 2005/0162411 A1 | 7/2005 | Berkel van | |
| 2006/0044288 A1 | 3/2006 | Nakamura et al. | |
| 2006/0045604 A1 | 3/2006 | Fukui et al. | |
| 2009/0057165 A1 * | 3/2009 | Park | A45C 11/04 206/6 |
| 2009/0251442 A1 | 10/2009 | Nakata | |
| 2010/0084202 A1 | 4/2010 | Selin et al. | |
| 2010/0090988 A1 * | 4/2010 | Park | G06F 3/03545 345/179 |
| 2011/0162894 A1 | 7/2011 | Weber | |
| 2011/0291999 A1 | 12/2011 | Liang et al. | |
| 2012/0043142 A1 | 2/2012 | Grivna | |
| 2012/0170966 A1 | 7/2012 | Novak, Jr. | |
| 2014/0029183 A1 | 1/2014 | Ashcraft et al. | |
| 2014/0035884 A1 * | 2/2014 | Oh | G06F 3/03545 345/179 |
| 2014/0035887 A1 | 2/2014 | Kim | |
| 2014/0071100 A1 | 3/2014 | Becerra Figueroa | |
| 2014/0253519 A1 | 9/2014 | David et al. | |
| 2014/0267180 A1 | 9/2014 | Buelow et al. | |
| 2014/0340368 A1 | 11/2014 | Locker et al. | |
| 2014/0340369 A1 | 11/2014 | Case et al. | |
| 2015/0084933 A1 | 3/2015 | Kinoshita et al. | |
| 2015/0205390 A1 | 7/2015 | Yeh | |
| 2017/0108949 A1 * | 4/2017 | Barel | G06F 3/03545 |
| 2017/0239976 A1 * | 8/2017 | Chen | B43K 23/06 |

FOREIGN PATENT DOCUMENTS

| | | |
|---|---|---|
| EP | 2693308 | 2/2014 |
| KR | 101473113 | 12/2014 |
| WO | WO 2015/116074 | 8/2015 |

OTHER PUBLICATIONS

International Search Report and the Written Opinion dated Dec. 22, 2016 From the International Searching Authority Re. Application No. PCT/US2016/055090. (13 pages).

Moons "ImprovElectronics Returns to Save the Day—Boogie Board Sync 9.7 Reviewed", Mobile Devices, 4 P., Jun. 19, 2014.

International Preliminary Report on Patentability dated Sep. 27, 2017 From the International Preliminary Examining Authority Re. Application No. PCT/US2016/055090. (12 Pages).

Official Action dated Dec. 29, 2017 From the US Patent and Trademark Office Re. U.S. Appl. No. 14/882,506. (11 pages).

International Search Report and the Written Opinion dated May 29, 2017 From the International Searching Authority Re. Application No. PCT/US2017/021233. (15 Pages).

Official Action dated Jul. 20, 2017 From the US Patent and Trademark Office Re. U.S. Appl. No. 14/882,506. (16 pages).

* cited by examiner

STYLUS WITH AN ADJUSTABLE DIMENSION

BACKGROUND

Styluses are known in the art for use with digitizer systems such as with digitizer systems that are integrated with a display screen, e.g. a touch screen. Stylus position is sensed by the digitizer system and used to provide input to a computing device associated with the display screen. Position of the stylus is typically correlated with virtual information displayed on the display screen. Inputs originating from the stylus are typically interpreted as user commands or user inputs for commands Some portable computing devices include a compartment for storing the stylus while the stylus is not in use.

SUMMARY

Due to the compact design of portable computing devices such as smart-phones, tablets and laptop computers, the portable devices are not thick enough to accommodate storing a full size stylus within the device. Typically, a diameter of a stylus would need to be reduced to accommodate storing the stylus in the device. Reducing the diameter, reduces comfort and may cause cramping of the hand with extended use. According to an aspect of some embodiments of the present disclosure there is provided a stylus that may assume a narrow or substantially flat configuration for storing the stylus in a dedicated compartment and may assume a wide or rounded configuration for providing a comfortable grip for holding the stylus. Typically, in the wide or rounded configuration, the cross-section of the stylus is substantially symmetrical.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1A:
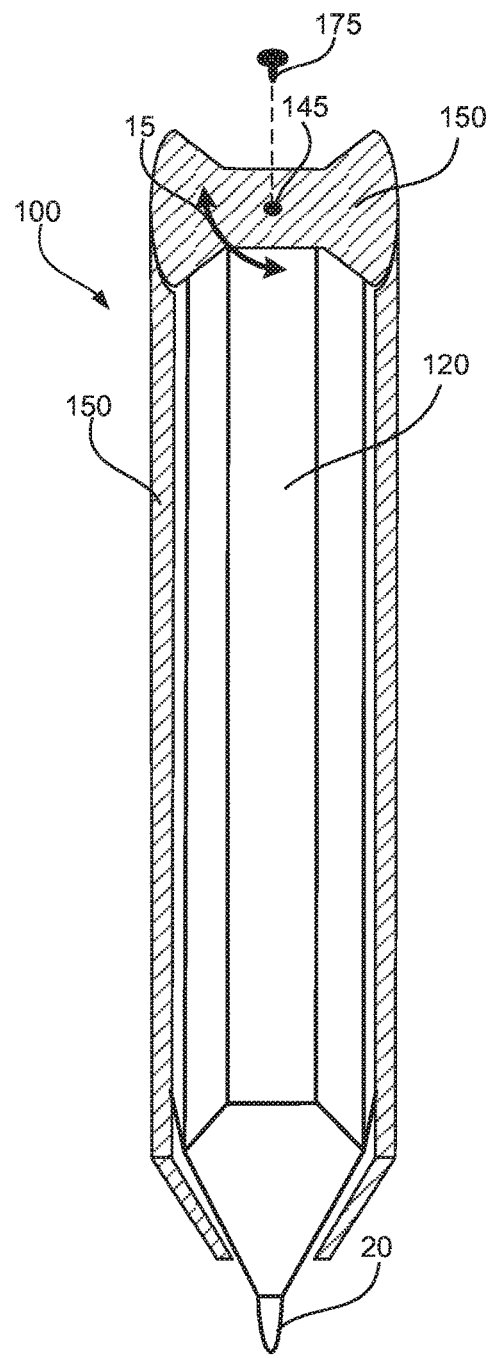
FIGS. 1A and 1B are simplified schematic views of an exemplary stylus including a housing having a bow shaped cross-section shown in a compact and full configuration respectively in accordance with some exemplary embodiments of the present disclosure.

In some exemplary embodiments, a stylus includes a housing with a generally flat configuration and a rigid shell that is rotatably connected to the housing. The shell in a first position may closely follow a contour of the housing so that dimensions of the stylus may be substantially the same as that of the housing. In a second position, the shell may complement the shape of the housing to create a symmetrical cross-section and thereby widen the stylus along one dimension. Typically, the shell extends over substantially a full length of the housing and may typically have a substantially same shape as at least a portion of the housing.

In some exemplary embodiments, the housing is cylindrical with a bow shaped cross-section. The cross-section of the housing typically includes a generally flat or narrow shaped central portion with peripheral portions that fan out from opposite ends of the central portion. A contour of the peripheral portions along an edge of the cross-section distal from the central portion may be rounded. In some exemplary embodiments, the corresponding shell includes elongated prongs or plates extending over a length of the stylus and fixed at one end to a disk perpendicular to the prongs. The disk is typically rotatably connected to an end of the housing that is distal to a writing tip of the stylus. The shape and width of the prongs typically follows a shape and width of the rounded portion of the bow-shaped cross-section. The shell may overlap the rounded portions of the bow-shaped cross-section to maintain a narrow configuration of the stylus and may fill in the area between the rounded portions to provide a wider configuration that is comfortable for writing. Optionally, the shell tapers toward a writing tip of the stylus.

In other exemplary embodiments, the housing is cylindrical with a semi-circular cross-section and the shell may extend along a length of the stylus with a semi-circular cross-section that follows the contour of the housing. The shell may be fixed at one end to a disk perpendicular that is rotatably connected to an end of the housing distal to a writing tip of the stylus. The shell overlaps the rounded portion of the housing to maintain a narrow configuration of the stylus and complements the rounded portion of the housing, e.g. covers the flat portion of the housing to provide a stylus with a circular cross-section. Optionally, the shell tapers toward a writing tip of the stylus.

In still other exemplary embodiments, each of the housing and the shell is a cylinder with a semi-circular cross-section. Optionally, a hinge connects the housing to the shell. While the stylus is stored in a dedicated compartment, the hinge is in an open configuration and the stylus is shaped as a pair of adjacent cylinders. Once removed from the dedicated compartment, the user may collapse the hinge so that the stylus has a circular cross-section. Optionally, a magnet or snap bumps are used to hold the housing to the shell in the rounded configuration of the stylus, e.g. collapsed position of the hinge.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1B:
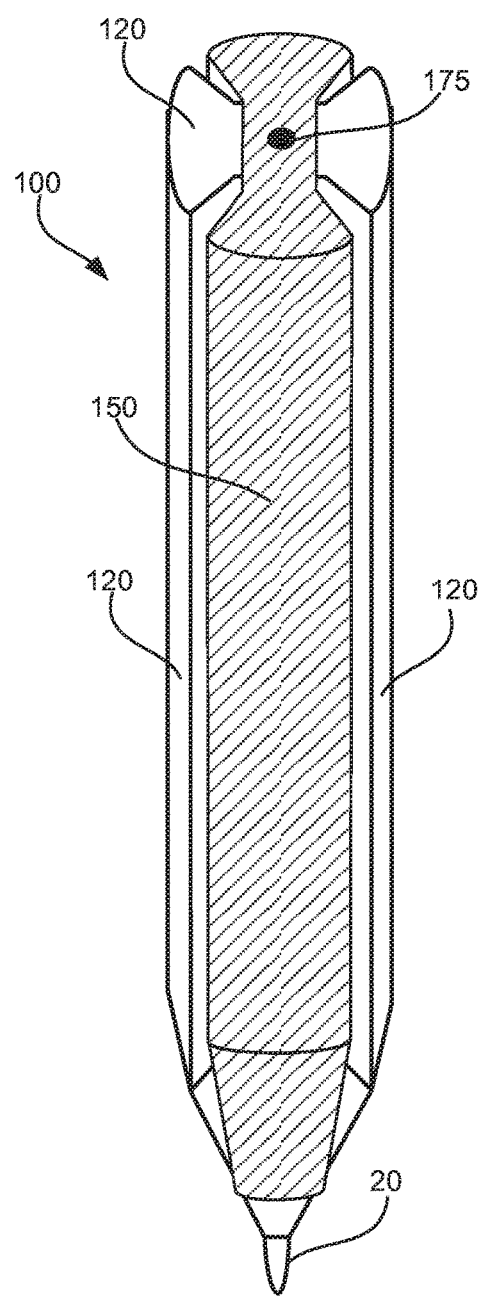
Figure 2A:
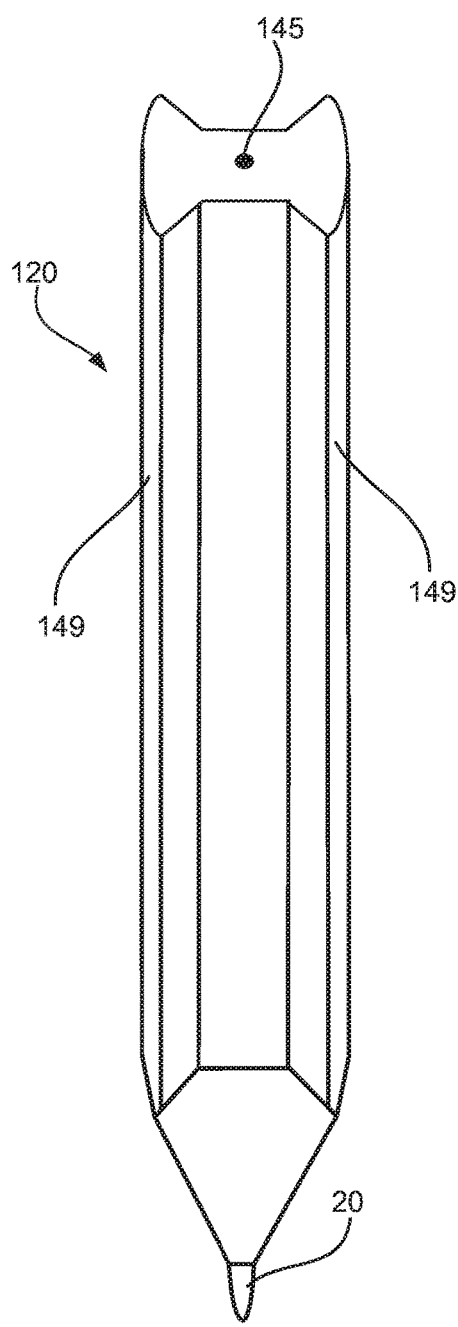
FIGS. 2A and 2B are simplified schematic views of the housing of the exemplary stylus and a shell of the exemplary stylus respectively in accordance with some exemplary embodiments of the present disclosure.
Figure 2B:
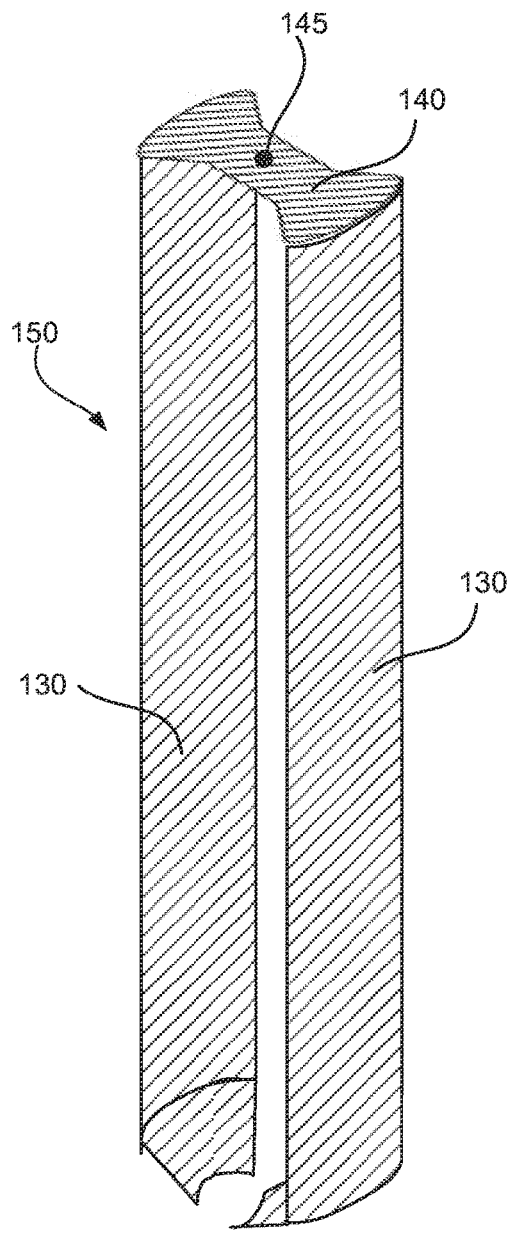

Reference is now made to FIGS. 1A and 1B showing simplified schematic views of an exemplary stylus including a housing having a bow shaped cross-section shown in a compact and full configuration respectively in accordance with some exemplary embodiments of the present disclosure. Reference is also made to FIGS. 2A and 2B showing simplified schematic views of the housing and a shell for completing the full configuration of the exemplary stylus respectively, in accordance with some exemplary embodiments of the present disclosure. According to some exemplary embodiments, a stylus 100 includes a housing 120 and a shell 150 that is rotatably mounted on housing 120. Typically, a pin 175 is fitted through a hole 145 through shell 150 and housing 120 that allows shell 150 to rotate in a direction shown by arrow 15. Typically, shell 150 is mounted at an end of stylus 100 distal from a writing tip 20. Optionally, shell 150 is tapered toward writing tip 20. While shell 150 is positioned as shown in FIG. 1A, the dimension of stylus 100 along one axis is more compact. Rotating shell 120 by 90° expands dimensions of stylus 100 by covering the concave portion of housing 120 and creates a symmetrical cross-sectional area for stylus 100. Shell 120 may be selectively locked in place with a spring activated lock or a magnet.

In some exemplary embodiments, housing 120 is cylindrical with a generally bow shaped crossed section. Shell 150 includes a disk 140 that has a same shape as the cross-section of housing 120 and two prongs 130 extending from an edge of disk 140 along a length of housing 120. Typically, prongs 130 overlap surfaces 149 of housing 120 furthest from an axis through hole 145 (FIG. 2A). The shell may be made from a plastic material or light metallic alloy, e.g. aluminum or magnesium.

Figure 3A:
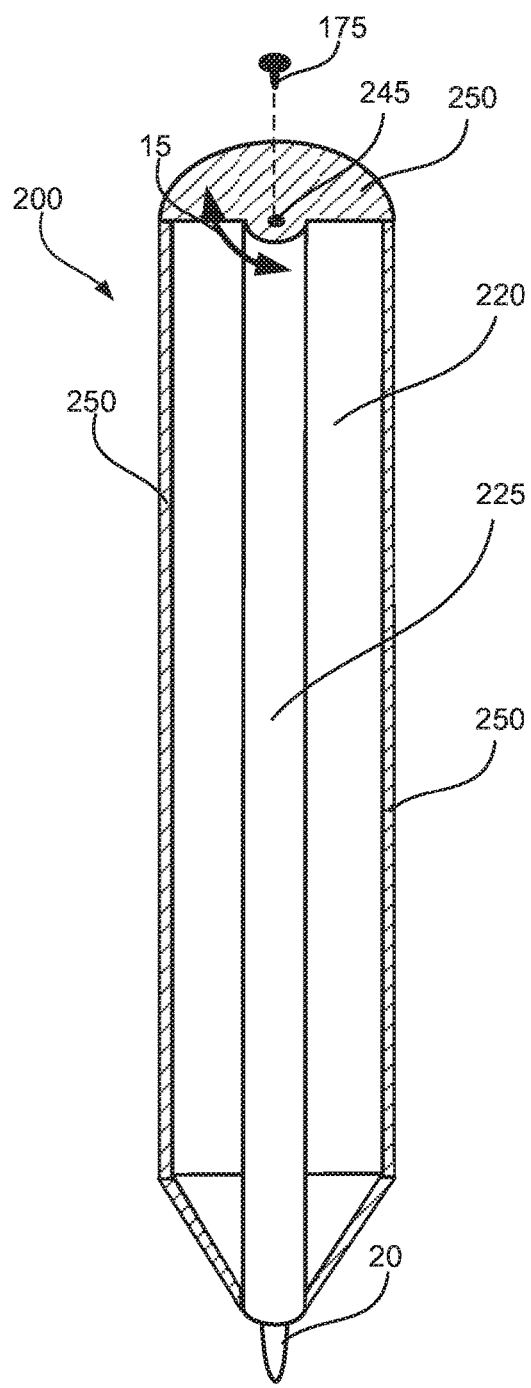
FIGS. 3A, 3B and 3C are simplified schematic views of another exemplary stylus including a housing having a substantially semi-circular cross-section shown in a compact and full configuration respectively in accordance with some exemplary embodiments of the present disclosure.
Figure 3B:
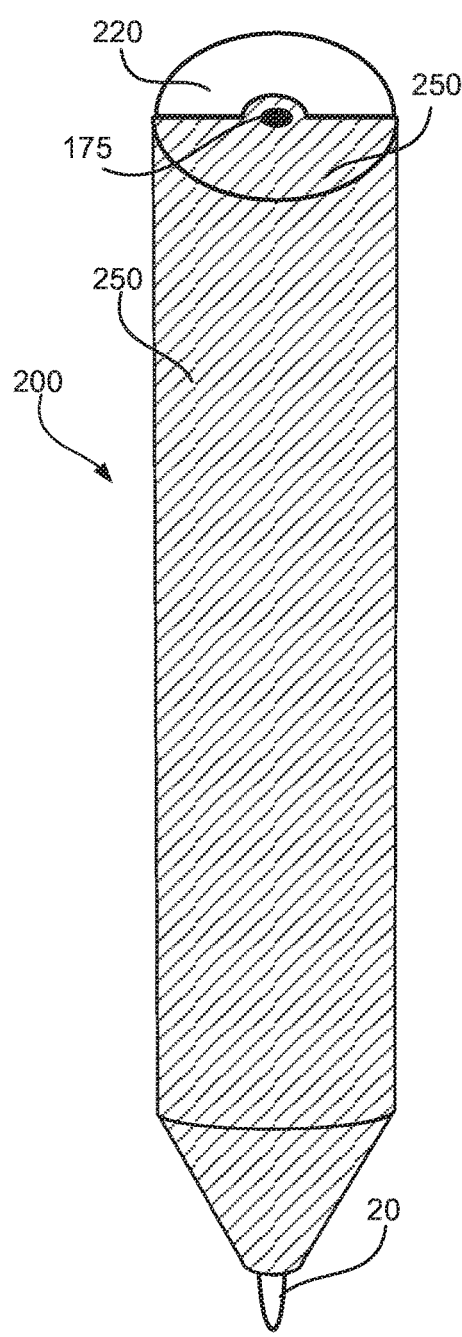
Figures 3C, 4:
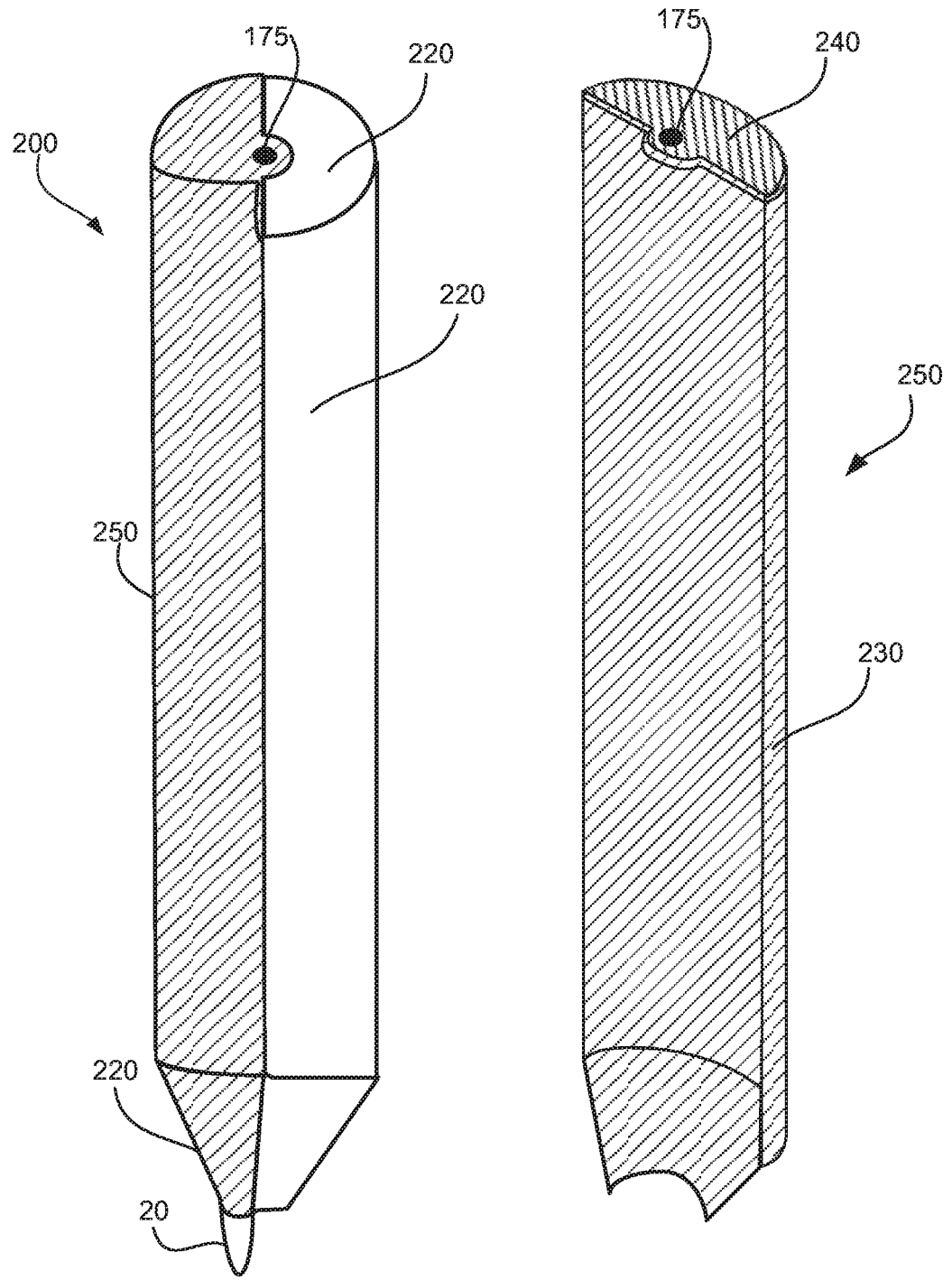
FIG. 4 is a simplified schematic view of a shell for stylus including a housing having a substantially semi-circular cross-section in accordance with some exemplary embodiments of the present disclosure.

Reference is now made to FIGS. 3A, 3B and 3C showing simplified schematic views of another exemplary stylus including a housing having a substantially semi-circular cross-section shown in a compact and full configuration respectively in accordance with some exemplary embodiments of the present disclosure. Reference is also made to FIG. 4 showing simplified schematic view of a shell for stylus including a housing having a substantially semi-circular cross-section in accordance with some exemplary embodiments of the present disclosure. According to some exemplary embodiments, a stylus 200 includes a housing 220 and a shell 250 that is rotatably mounted on housing 220. In some exemplary embodiments, housing 220 is cylindrical with a generally semi-circular cross-section. While shell 250 is positioned as shown in FIG. 3A, the dimension of stylus 200 along one axis is more compact. Rotating shell 220 by 180° expands dimensions of stylus 200 to a full circular cross-section by covering the generally flat portion of housing 220. Shell 250 may be selectively locked in place with a spring activated lock or a magnet. Optionally, shell 250 is tapered toward tip 20.

Optionally, housing 220 includes a rounded portion 225 protruding from a flat section of the semi-circular cross-section near the center of the semi-circle and extending along a length of the housing. Optionally, rounded portion 225 accommodates positioning tip 20 at a center of stylus 200 in a configuration shown in FIG. 3B. In some exemplary embodiments, shell 250 is formed from a disk 240 that has a same shape as the cross-section of housing 220 and a plate 230 extending from rounded edge of disk 240 along a length of housing 220. Plate 230 may have a semi-circular cross-section with substantially same dimensions as housing 220. Typically, plate 130 overlaps the rounded surface of housing 220. The shell may be made from a plastic material or light metallic alloy, e.g. aluminum or magnesium.

Typically, a pin 175 is fitted through a hole 245 through shell 250 and housing 220 that allows shell 250 to rotate in a direction shown by arrow 15. Typically, shell 250 is mounted at an end of stylus 200 distal from a writing tip 20.

Figures 5A, 5B:
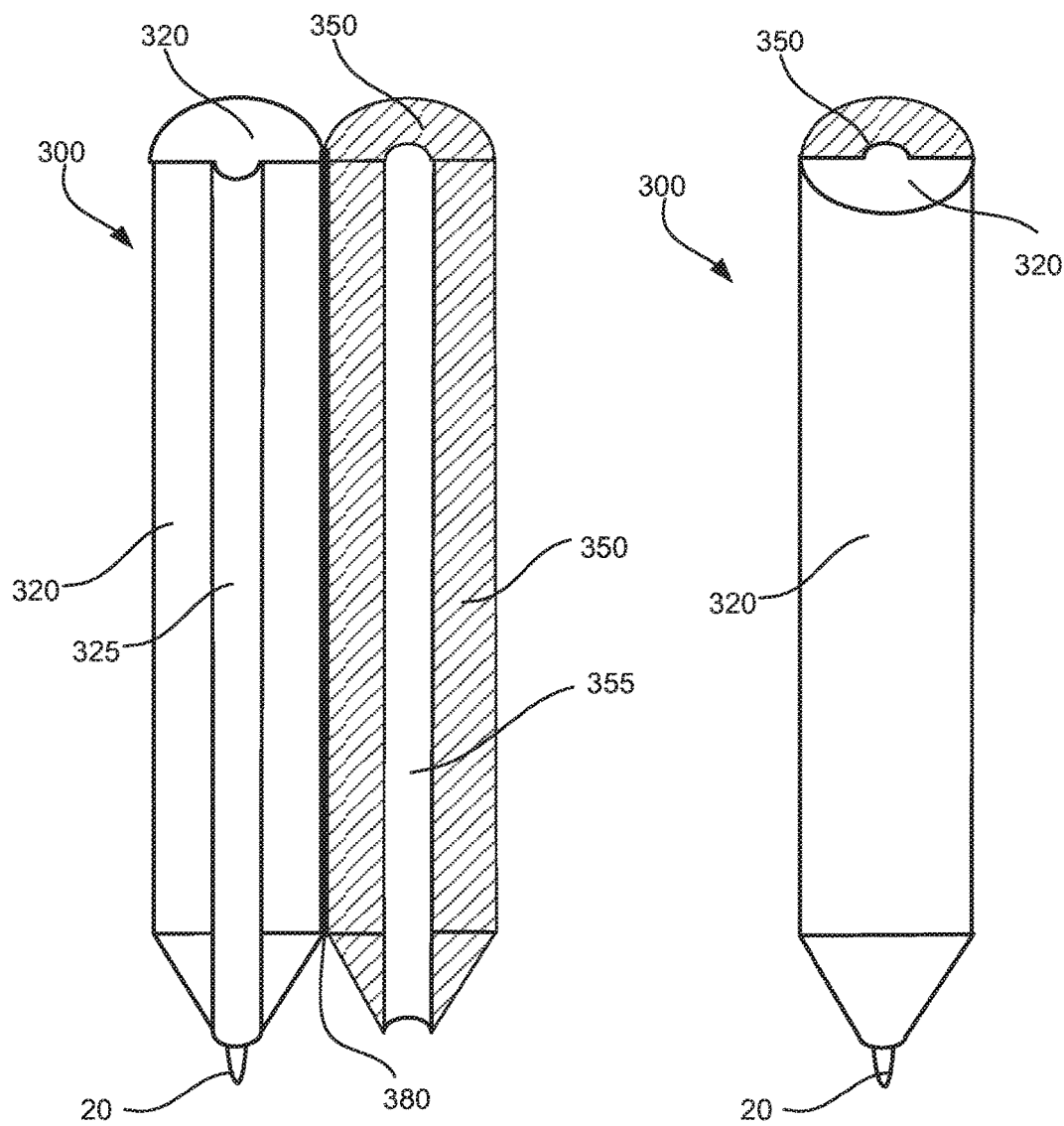
FIGS. 5A and 5B are simplified schematic views of yet another exemplary stylus including a cylindrical housing and a cylindrical shell each with substantially semi-circular cross and connected with a hinge shown in a opened and closed configuration respectively in accordance with some exemplary embodiments of the present disclosure.

Reference is now made to FIGS. 5A and 5B showing simplified schematic views of yet another exemplary stylus including a cylindrical housing and a cylindrical shell each with substantially semi-circular cross and connected with a hinge shown in a opened and closed configuration respectively in accordance with some exemplary embodiments of the present disclosure. In some exemplary embodiments, a shell 350 or dummy housing is a hollow cylinder with a substantially semi-circular cross-section and extending over a substantially full length of housing 320. Housing 320 may also have a substantially semi-circular cross-section with substantially same dimensions as shell 350. Typically, shell 350 is pivotally connected to housing 320 with hinge 380. Hinge 380 in FIG. 5A is shown to extend along an entire length of shell 350. Alternatively, one or more small hinges may replace hinge 380. Housing 320 and shell 350 may form a circular cross-section while in a closed configuration (FIG. 5B).

In some exemplary embodiments, housing 320 may include rounded section 325 along its longitudinal axis that protrudes from a flat surface of housing 320.

Optionally rounded section accommodates housing tip 20 so that tip 20 will be centered in the closed configuration (FIG. 5B). Typically, shell 350 may have a corresponding concave rounded portion 355 that receives rounded section 325 that protrudes out of housing 320. Optionally, a magnet on a flat surface of shell 350 (or housing 320) may be used to selectively maintain a closed configuration. Optionally, a mechanical lock may be used to maintain a closed configuration.

Figure 6:
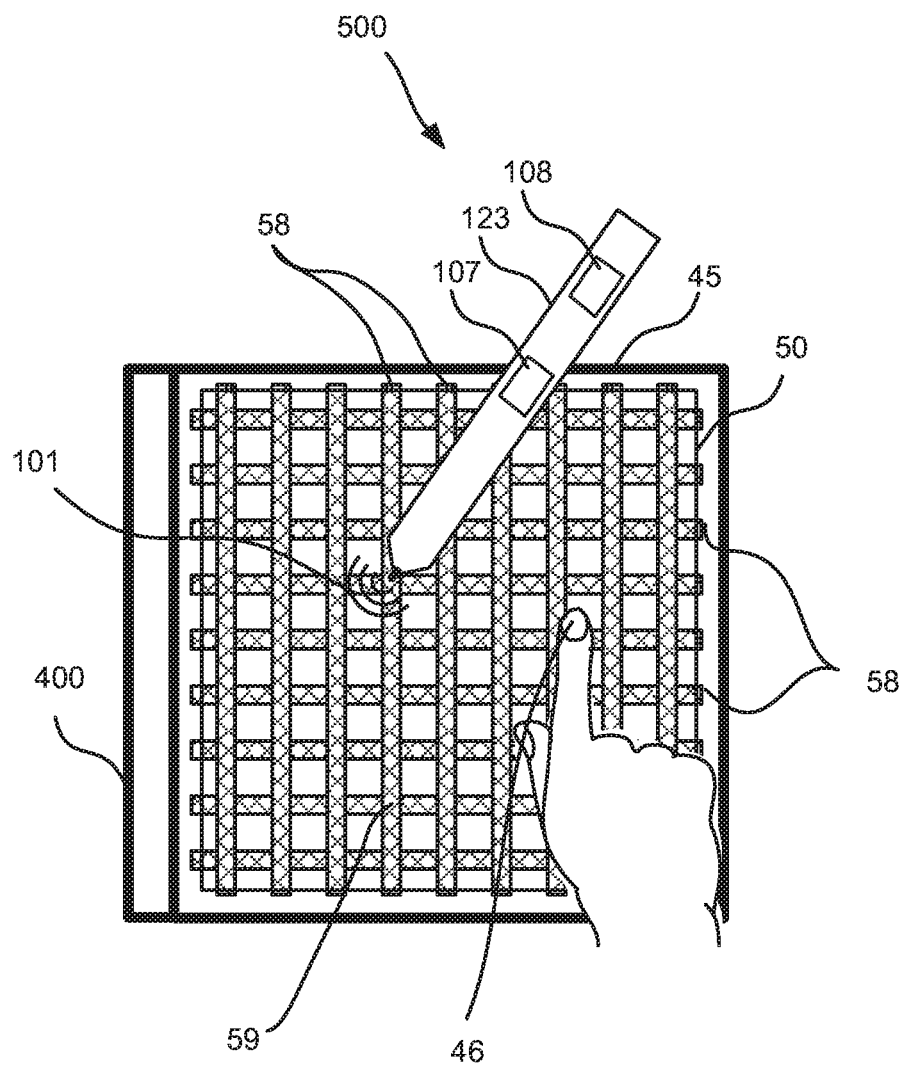
FIG. 6 is a simplified block diagram of a stylus and a touch screen operated with a stylus or fingertip in accordance with some embodiments of the present disclosure.

Reference is now made to FIG. 6 showing a simplified block diagram of a stylus and a touch screen operated with a stylus or fingertip in accordance with some embodiments of the present disclosure. According to some embodiments of the disclosure, a touch screen 500 receives input from a stylus 123 or fingertip 46. Digitizer sensor 50 is typically integrated with a display 45 of touch screen 500.

Optionally, digitizer system 50 is a grid based capacitive sensor formed with a plurality of conductive lines 58 arranged to define grid junctions 59. In some exemplary embodiments, stylus 123 is an active stylus that transmits signals 101 that can be picked up by a digitizer sensor 50. Stylus 123 may include electronic components 107, e.g. an application specific integrated circuit (ASIC) and a power supply 108, e.g. one or more batteries housed in a housing of stylus 123. Stylus 123 may be any one of styluses 100, 200 or 300. Alternatively, stylus 123 may be a passive stylus with no electric components.

In some exemplary embodiments, stylus 123 has a narrow or compact configuration that fits into a dedicated compartment 400 of touch screen 500. Typically, dedicated compartment 400 fits within a thickness of touch screen 500 which is generally uniform. Optionally, dedicated compartment 400 may be exposed on a front face of touch screen 500.

Once stylus 123 is removed from compartment 400, a user may switch the configuration of stylus 123 to a full or wide configuration that is comfortable to hold. Whenever, the user desires to store stylus 123 in compartment 300, the configuration of stylus 123 may be switched again to its narrow or compact configuration. Switching is typically performed manually by turning a shell of stylus 123 around its hinge as has been described herein. Optionally, stylus 123 may include a spring loaded activation button to actuate the switching between configurations.

Figure 7A:
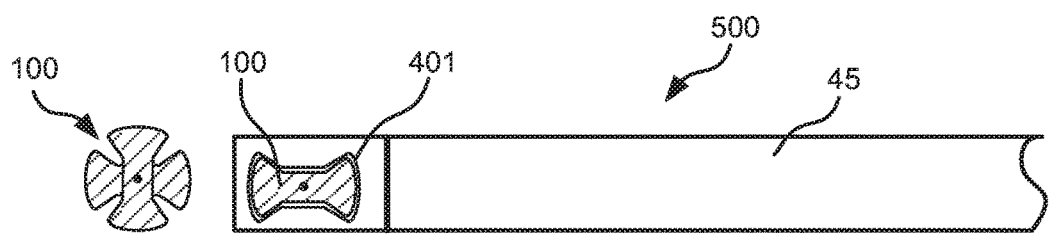
FIGS. 7A, 7B and 7C are simplified schematic side views of touch screens including exemplary dedicated compartments for storing exemplary styluses and corresponding schematic top views of the exemplary styluses outside the compartments shown in their full configuration in accordance with some embodiments of the present disclosure.
Figure 7B:
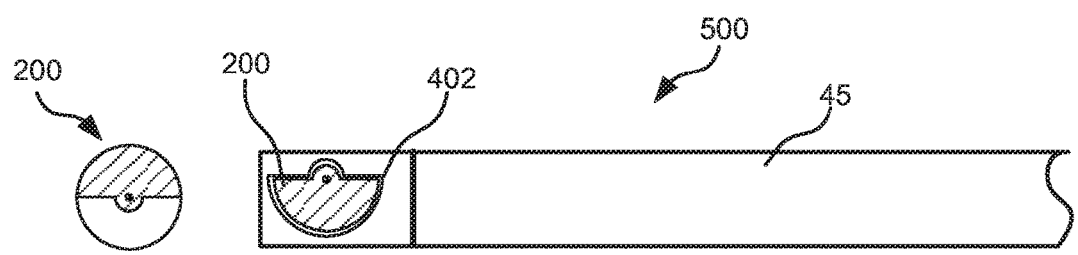
Figure 7C:
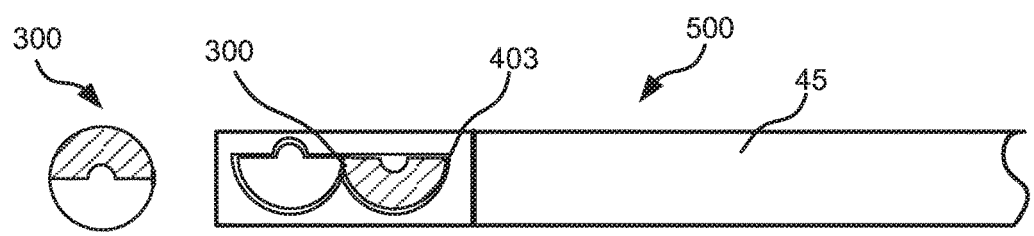

Reference is now FIGS. 7A, 7B and 7C showing simplified schematic side views of touch screens including exemplary dedicated compartments for storing exemplary styluses and corresponding schematic top views of the exemplary styluses outside the compartments shown in their full configuration in accordance with some embodiments of the present disclosure. According to exemplary embodiments, each of styluses 100, 200 and 300 may fit into a corresponding compartment 401, 402 and 403. The dedicated compartments may be positioned alongside display 45 as shown or alternatively under display 45. Typically, the compartments 401, 402 and 403 penetrate through a thickness of touch screen 500. Optionally, one or more of compartments 401, 402 and 403 may be exposed on a face of touch screen 500.

In some exemplary embodiments, the compartments 401 and 402 have a same shape the corresponding stylus that is to be stored in the compartment. The exemplary compartment 403 has a shape of stylus 300 in its open configuration including both shell 350 and housing 320.

Figure 8A:
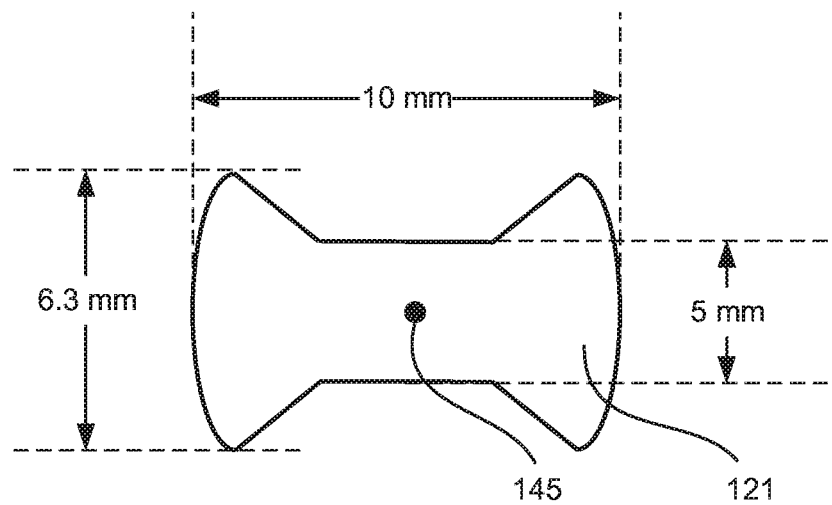
FIGS. 8A, 8B, 8C and 8D show exemplary dimensions for cross-sections of four exemplary housings in accordance with some embodiments of the present disclosure.
Figure 8B:
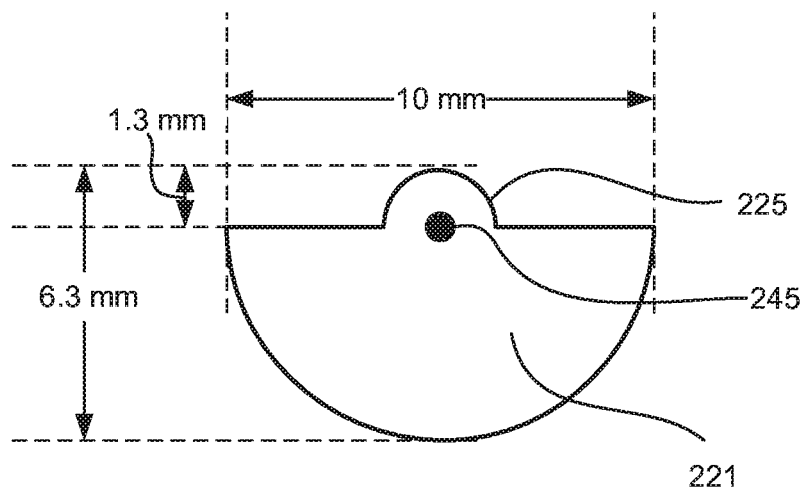
Figure 8C:
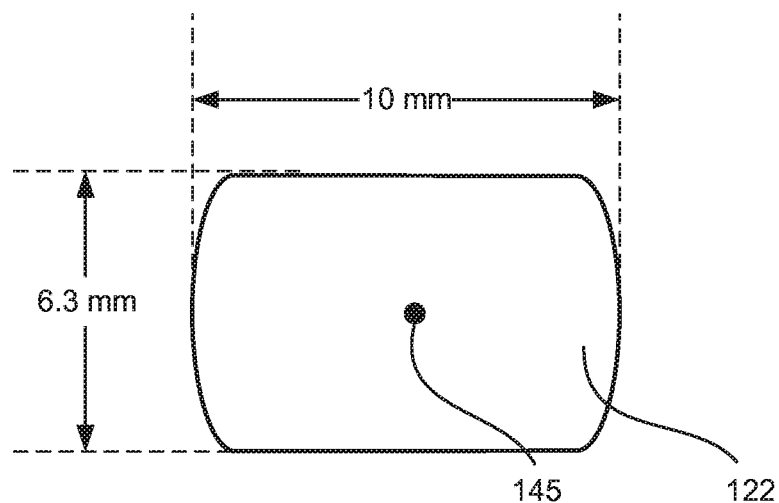
Figure 8D:
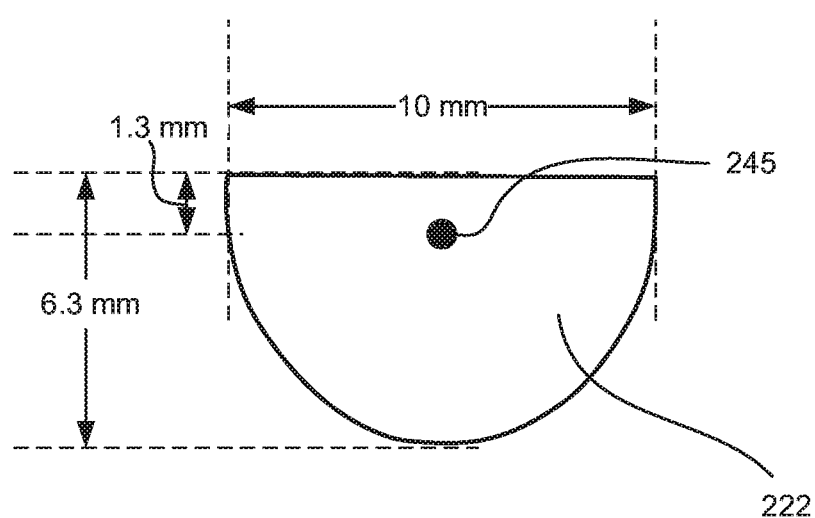

Reference is now FIGS. 8A, 8B, 8C and 8D showing exemplary dimensions for cross-sections of four exemplary housings in accordance with some embodiments of the present disclosure. In some exemplary embodiments, a stylus including a housing and a movable shell as described herein may be used to selectively reduced dimensions of the stylus along one axis by about by 30%-40% for storing the stylus. In the examples shown, the dimensions of the housings are shown to be narrowed by 37% along one dimension. Optionally, a widest dimension of bow shaped cross-section 121 may be 10 mm. The dimension of section 121 perpendicular to the axis with the widest dimension may be 6.3 mm. Optionally, but not necessarily, housing may narrow toward the center to form the bow shape and the dimension of the most narrow section may be about 5 mm. Section 121 is large enough to accommodate components of the stylus, e.g. a battery, an ASIC, a writing tip and optionally other mechanical and electric components used for an active stylus. Alternatively, a housing 122 may have a steady thickness of about 6.3 mm (FIG. 8C).

A stylus with a 10 mm diameter, e.g. 9-11 or 9.5-10 mm is typically comfortable for writing. However, the thickness of some tablets may also be about 10 mm. If a stylus is to be stored in such a tablet, its dimension along at least one axis must be reduced so that it may be accommodated within the thickness of the tablet. For smaller devices, e.g. smartphones, a stylus with a smaller diameter, e.g. 8 mm diameter in a full configuration may be used. Optionally, the smaller stylus in a compact configuration may have cross section 5 mm×8 mm.

Referring now to FIG. 8B, semi-circular cross-section 221 may have similar dimensions as described in reference to FIG. 8A. A diameter of the semi-circle may be 10 mm. Optionally, a semi-circular region 225 at the center of section 221 adds an additional 1.3 mm to the thickness. Semi-circular region 225 provides for housing tip 20 at the center of the full configuration of the stylus and is large enough to accommodate components of the stylus, e.g. a battery, an ASIC and optionally other mechanical and electric components. Alternatively, a housing 222 may be a section of a circle that is larger than a semi-circle (FIG. 8D) and semi-circular region 225 is not required.

According to some exemplary embodiments, there is provided a stylus comprising: a housing having a cylindrical shape associated with a first cross-sectional area, wherein the first cross-sectional area has a first dimension along a first axis and a second dimension along a second axis, the first axis perpendicular to the second axis, and wherein the first dimension is smaller than the second dimension; and a shell rotatably connected to the housing, wherein a second cross-sectional area including both the shell and the housing has a third dimension along the first axis that is substantially the same as the first dimension while the shell is in a first position and substantially the same as the second dimension while the shell is in a second position.

Optionally, the shell is formed from a disk and at least one plate extending from the disk in a direction that is perpendicular to the disk.

Optionally, the disk is mounted on a first end of the stylus, wherein the first end is distal to an end of the stylus that includes a writing tip.

Optionally, the disk has a same shape as the first cross-sectional area.

Optionally, the first dimension is at least 30% smaller than the second dimension.

Optionally, the first cross-sectional area is bow shaped.

Optionally, the shell is formed from a bow-shaped disk and a pair of oppositely facing plates extending from the disk in a direction that is perpendicular to the disk.

Optionally, a distance between the pair of plates is substantially the same as the second dimension.

Optionally, the first cross-sectional area is substantially a semi-circle.

Optionally, the first cross-sectional area includes a protrusion near a center of the semi-circle.

Optionally, the shell is formed from a substantially semi-circular disk and a plate extending from a rounded edge of the disk in a direction that is perpendicular to the disk.

Optionally, the stylus is configured for being stored in a dedicated compartment in touch-screen while in the first position.

Optionally, a diameter of the stylus while the stylus is in the second position is substantially 10 mm.

Optionally, the second cross-sectional area is symmetric.

Optionally, the stylus includes a locking mechanism to selectively lock the stylus in the first position.

According to some exemplary embodiments, there is provided a stylus comprising: a housing having a cylindrical shape associated with a substantially semi-circular cross-sectional area; and a shell pivotally connected to the housing, wherein the shell has substantially same cylindrical shape as the housing, wherein the housing and the shell form a circular cross-sectional area while in a closed position and form a shape of two semi-circles positioned side by side while in an open position.

Optionally, the housing includes a protrusion near a center of a flat part of the semi-circle of the housing and the shell has a corresponding concave portion near a center of a flat part of the semi-circle of the shell.

Optionally, the stylus is configured for being stored in a dedicated compartment in a touch-screen while in the open position.

Optionally, a diameter of the stylus while the stylus is in the second position is at substantially 10 mm.

Optionally, the stylus includes a magnet or snap bumps for maintaining the closed position.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. An electronic stylus comprising:
a housing containing at least a power supply therein, the housing having a generally elongate shape associated with a first cross-sectional area, wherein the first cross-sectional area has a first dimension along a first axis and a second dimension along a second axis, the first axis perpendicular to the second axis, and wherein the first dimension is smaller than the second dimension; and
a shell rotatably connected to the housing, wherein a second cross-sectional area including both the shell and the housing has a third dimension along the first axis that is substantially the same as the first dimension while the shell is in a first position and substantially the same as the second dimension while the shell is in a second position.

2. The stylus according to claim 1, wherein the shell is formed from a disk and at least one plate extending from the disk in a direction that is perpendicular to the disk.

3. The stylus of claim 2, wherein the disk is mounted on a first end of the stylus, wherein the first end is distal to an end of the stylus that includes a writing tip.

4. The stylus of claim 2, wherein the disk has a same shape as the first cross-sectional area.

5. The stylus of claim 1, wherein the first dimension is at least 30% smaller than the second dimension.

6. The stylus according to claim 1, wherein the first cross-sectional area is bow-tie shaped.

7. The stylus according to claim 6, wherein the shell is formed from a bow-tie-shaped disk and a pair of oppositely facing plates extending from the disk in a direction that is perpendicular to the disk.

8. The stylus according to claim 7, wherein a distance between the pair of plates is substantially the same as the second dimension.

9. The stylus according to claim 1, wherein the first cross-sectional area is substantially a semi-circle.

10. The stylus according to claim 9, wherein the first cross-sectional area includes a protrusion near a center of the substantial semi-circle.

11. The stylus according to claim 9, wherein the shell is formed from a substantially semi-circular disk and a plate extending from a rounded edge of the disk in a direction that is perpendicular to the disk.

12. The stylus according to claim 1, wherein the stylus is configured for being stored in a dedicated compartment in touch-screen while in the first position.

13. The stylus according to claim 1, wherein a diameter of the stylus while the stylus is in the second position is substantially 9.5-10 mm.

14. The stylus according to claim 1, wherein the second cross-sectional area is symmetric.

15. The stylus according to claim 1, comprising a locking mechanism to selectively lock the stylus in the first position.

16. An electronic stylus comprising:
a housing containing at least a power supply therein, the housing having a substantially semi-circular cross-sectional area; and
a shell pivotally connected to the housing, wherein the housing and the shell form a circular cross-sectional area while in a closed position and form a shape of two semi-circles positioned side by side while in an open position.

17. The stylus of claim 16, wherein the housing includes a protrusion near a center of a flat part of the semi-circle of the housing and the shell has a corresponding concave portion near a center of a flat part of the semi-circle of the shell.

18. The stylus according to claim 16, wherein the stylus is configured for being stored in a dedicated compartment in a touch-screen while in the open position.

19. The stylus according to claim 16, wherein a diameter of the stylus while the stylus is in the closed position is at substantially 10 mm.

20. The stylus according to claim 16, comprising a magnet or snap bumps for maintaining the closed position.

* * * * *